Patented Feb. 16, 1926.

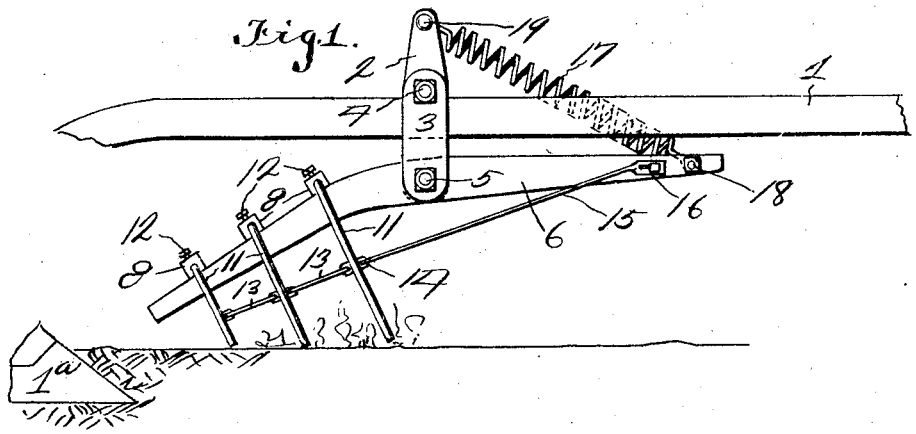
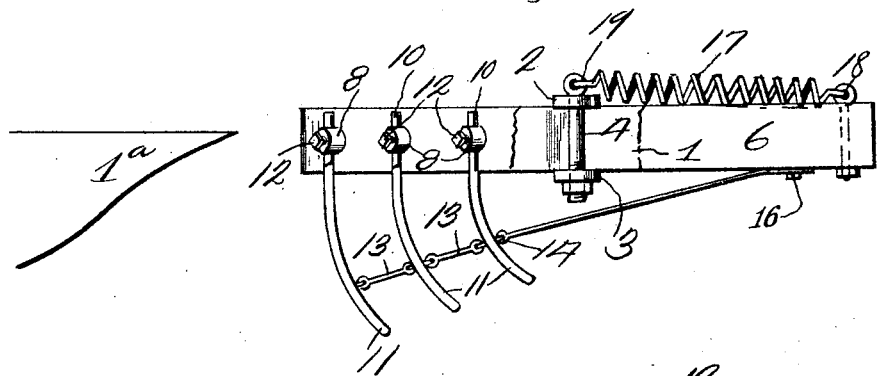
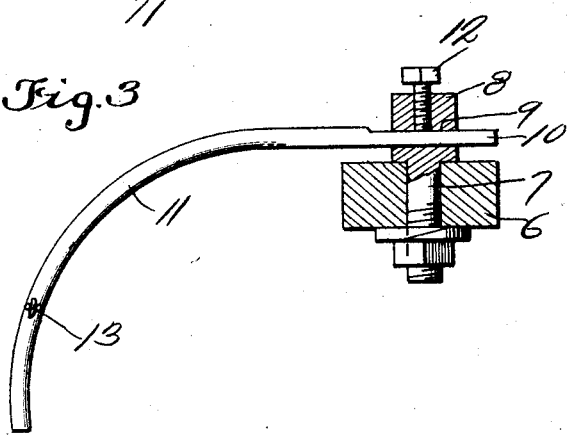

1,573,592

UNITED STATES PATENT OFFICE.

JOHN WICKER AND JOSEPH E. McGOUGH, OF SPRAGUE, WASHINGTON.

WEED GATHERER FOR PLOWS.

Application filed August 25, 1925. Serial No. 52,348.

*To all whom it may concern:*

Be it known that we, JOHN WICKER and JOSEPH E. McGOUGH, citizens of the United States, residing at Sprague, in the county of Lincoln, State of Washington, have invented a new and useful Weed Gatherer for Plows; and we do hereby declare the following to be a full, clear, and exact description of the invention, such as will enable others skilled in the art to which it appertains to make and use the same.

The invention relates to weed gatherers for plows and has for its object to provide a device of this character particularly adapted for use in connection with gang plows, however applicable to other types of plows. The device comprises a clamp through which the plow beams extends and which clamp has pivotally connected thereto beneath the plow beam a rocker bar, the rear end of which is provided with outwardly extending curved weed engaging arms, and the forward end of the rock bar has connected thereto a coiled spring which extends upwardly and is anchored to the clamp above the plow beam for normally forcing the rear end of the rockable bar downwardly, and maintaining the curved arms in engagement with the ground.

A further object is to provide a brace bar connected to the forward end of the rock bar and connected to the forward ground engaging arm, and link connections between the ground engaging arms, thereby thoroughly bracing the ground engaging arms and relieving the twisting strain on the ground engaging arms.

With the above and other objects in view the invention resides in the combination and arrangement of parts as hereinafer set forth, shown in the drawing, described and claimed, it being understood that changes in the precise embodiment of the invention may be made within the scope of what is claimed without departing from the spirit of the invention.

In the drawings:—

Figure 1 is a side elevation of the device showing the same applied to a plow beam.

Figure 2 is a top plan view of the weed gatherer and deflector.

Figure 3 is a transverse sectional view through the rock bar showing one of the weed engaging arms in front elevation.

Referring to the drawing, the numeral 1 designates a conventional form of plow beam and 1ª the plow point carried at the rear end thereof. It has been found that weeds gather against the plow point and clog the same, and to obviate this difficulty the present device is primarily designed. The weed gatherer and deflector comprises spaced vertically disposed plates 2 and 3, which plates are in engagement with opposite sides of the plow beam 1 and are securely clamped thereto by means of the transversely disposed bolt 4 above the plow beam and the transversely disposed bolt 5 below the plow beam and spaced downwardly from the plow beam. Rockably mounted on the transversely disposed bolt 5 below the plow beam 1 is a longitudinally disposed rock bar 6. The rear end of the rock bar 6 inclines downwardly and rearwardly towards the plow point 1ª, and is provided with headed bolts 7, which extend therethrough. The heads 8 of the bolts 7 are provided with angularly shaped apertures 9, which receive the angularly shaped ends 10 of the outwardly and downwardly extending weed engaging arms 11, which weed engaging arms are securely held in the heads 8 by means of set screws 12, therefore it will be seen that the arms 11 are positively held against twisting. As the plow moves forwardly the arms 11 engage the weeds and deflect the same from the plow point 1ª, however to further brace the curved arms 11, said arms are provided with link connections 13 and connected to the forward arm 11 at 14 is a forwardly and upwardly extending brace rod 15, which brace rod is anchored at 16 to the rock bar 6 adjacent its forward end, and is substantially in alinement with the links 13, therefore it will be seen that the arms 11 will be thoroughly braced against a twisting operation as the plow moves forwardly over the ground. It is obvious the contour of the ground will vary and means must be provided to hold the rear end of the rock bar down in engagement with the ground and to accomplish this result a coiled spring 17 is provided which coiled spring is anchored at 18 to the forward end of the rock bar 6 and extends upwardly to one side of the plow beam 1 and is anchored at 19 to the upper end of the plate 2. It will be seen that the coiled spring 17 will exert an upward pull on the forward end of the rock bar 6 at all times, and the weed engaging fingers 11 will be forced downwardly and will follow the contour of the ground thereby positively gathering the weeds and deflecting the same.

From the above it will be seen that a weed gathering and deflecting device is provided for plows, which device will positively deflect and gather the weeds, and one which may be easily and quickly applied to a conventional form of plow and plow beam without varying the construction thereof.

The invention having been set forth what is claimed as new and useful is:—

The combination with a plow beam carried weed gatherer comprising a rock bar disposed beneath the beam, spring means for forcing the rear end of the rock bar downwardly, outwardly and downwardly curved arms carried by the rear end of the rock bar, of link connections between said arms, a brace rod connected to the forward arm in alinement with the link connections, said brace rod extending forwardly and upwardly and anchored to the forward end of the rock bar.

In testimony whereof we have signed our names to this specification.

JOHN WICKER.
JOSEPH E. McGOUGH.